(12) United States Patent
Kim et al.

(10) Patent No.: US 11,222,624 B2
(45) Date of Patent: Jan. 11, 2022

(54) SERVER FOR PROVIDING VOICE RECOGNITION SERVICE

(71) Applicant: LG ELECTRONICS INC., Seoul (KR)

(72) Inventors: Jaehong Kim, Seoul (KR); Hangil Jeong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 197 days.

(21) Appl. No.: 16/545,794

(22) Filed: Aug. 20, 2019

(65) Prior Publication Data
US 2020/0074990 A1 Mar. 5, 2020

(30) Foreign Application Priority Data
Sep. 3, 2018 (KR) .......... 10-2018-0104694

(51) Int. Cl.
*G10L 15/16* (2006.01)
*G10L 15/22* (2006.01)
(Continued)

(52) U.S. Cl.
CPC .............. *G10L 15/16* (2013.01); *G10L 15/06* (2013.01); *G10L 15/083* (2013.01); *G10L 15/22* (2013.01);
(Continued)

(58) Field of Classification Search
CPC ......... G10L 15/16; G10L 15/22; G10L 17/18; G10L 15/083; G10L 15/06; G10L 15/32;
(Continued)

(56) References Cited

U.S. PATENT DOCUMENTS

| | | | |
|---|---|---|---|
| 7,225,125 B2 * | 5/2007 | Bennett | G10L 15/22 704/233 |
| 8,583,432 B1 * | 11/2013 | Biadsy | G10L 15/18 704/235 |

(Continued)

FOREIGN PATENT DOCUMENTS

| | | |
|---|---|---|
| JP | H 09 134191 | 5/1997 |
| JP | 2005-215689 | 8/2005 |

(Continued)

OTHER PUBLICATIONS

International Search Report dated Dec. 27, 2019 issued in Application PCT/KR2019/011341.
(Continued)

*Primary Examiner* — Thuykhanh Le
(74) *Attorney, Agent, or Firm* — Ked & Associates, LLP

(57) ABSTRACT

A server may provide a voice recognition service. The server may include a memory configured for storing a plurality of voice recognition models, a communication device configured for communicating a plurality of voice recognition devices, and an artificial intelligence device configured for providing a voice recognition service to the plurality of voice recognition devices, acquiring use-related information regarding a first voice recognition device (from among the plurality of voice recognition devices), and changing a voice recognition model corresponding to the first voice recognition device from a first voice recognition model to a second voice recognition model based on the use-related information.

18 Claims, 5 Drawing Sheets

(51) Int. Cl.
  *G10L 17/18* (2013.01)
  *G10L 15/08* (2006.01)
  *G10L 15/06* (2013.01)
  *G10L 15/32* (2013.01)

(52) U.S. Cl.
  CPC .............. *G10L 15/32* (2013.01); *G10L 17/18* (2013.01); *G10L 2015/0631* (2013.01); *G10L 2015/225* (2013.01)

(58) Field of Classification Search
  CPC ....... G10L 2015/0631; G10L 2015/225; G10L 15/01; G10L 2015/227; G10L 15/30; G10L 15/14; G10L 15/18
  USPC ......................................................... 704/232
  See application file for complete search history.

(56) References Cited

U.S. PATENT DOCUMENTS

| | | | |
|---|---|---|---|
| 2005/0075875 A1 | 4/2005 | Shozakai et al. | |
| 2005/0171926 A1 | 8/2005 | Thione et al. | |
| 2008/0040099 A1* | 2/2008 | Wu | G06F 40/263 704/9 |
| 2008/0201136 A1 | 8/2008 | Fujimura et al. | |
| 2008/0228480 A1* | 9/2008 | Maegawa | G10L 15/07 704/235 |
| 2008/0255839 A1* | 10/2008 | Larri | G10L 15/08 704/238 |
| 2009/0138263 A1* | 5/2009 | Shozakai | G06K 9/00335 704/243 |
| 2009/0240488 A1* | 9/2009 | White | G10L 15/22 704/9 |
| 2011/0077942 A1* | 3/2011 | Ljolje | G10L 15/065 704/244 |
| 2013/0246072 A1* | 9/2013 | Duffield | G10L 15/22 704/275 |
| 2013/0325447 A1* | 12/2013 | Levien | G10L 15/30 704/201 |
| 2014/0067375 A1* | 3/2014 | Woofers | G06F 40/40 704/9 |
| 2014/0108003 A1* | 4/2014 | Phillips | G06F 40/263 704/8 |
| 2014/0163977 A1* | 6/2014 | Hoffmeister | G10L 15/32 704/232 |
| 2014/0188459 A1* | 7/2014 | Fink | G06F 40/30 704/9 |
| 2015/0073774 A1* | 3/2015 | Becker | G06F 40/242 704/9 |
| 2015/0120277 A1* | 4/2015 | Song | G06F 40/58 704/2 |
| 2016/0267913 A1* | 9/2016 | Kim | G06F 1/3215 |
| 2016/0379626 A1* | 12/2016 | Deisher | G10L 15/197 704/232 |
| 2018/0182386 A1* | 6/2018 | Lee | G10L 15/14 |
| 2018/0301144 A1* | 10/2018 | Park | G10L 15/10 |
| 2018/0342239 A1* | 11/2018 | Baughman | G10L 15/063 |
| 2018/0366109 A1* | 12/2018 | Huang | G10L 15/26 |
| 2019/0012447 A1* | 1/2019 | Lesso | G10L 17/00 |
| 2019/0042565 A1* | 2/2019 | Choi | G10L 25/69 |
| 2019/0051288 A1* | 2/2019 | Lee | G10L 15/183 |
| 2019/0051306 A1* | 2/2019 | Torama | G10L 15/02 |
| 2019/0088251 A1* | 3/2019 | Mun | G10L 15/063 |
| 2019/0197106 A1* | 6/2019 | Doggett | G06F 16/3329 |
| 2019/0206389 A1* | 7/2019 | Kwon | G10L 15/32 |
| 2019/0206394 A1* | 7/2019 | Ichikawa | G10L 15/063 |
| 2019/0287519 A1* | 9/2019 | Ediz | G06F 40/30 |
| 2019/0318724 A1* | 10/2019 | Chao | G10L 15/14 |
| 2019/0318729 A1* | 10/2019 | Chao | G10L 15/08 |
| 2019/0325863 A1* | 10/2019 | Martin | G06N 3/08 |
| 2019/0348023 A1* | 11/2019 | Kwon | G10L 15/063 |
| 2019/0348025 A1* | 11/2019 | Berenzweig | G10L 15/22 |
| 2019/0348026 A1* | 11/2019 | Berenzweig | G06F 3/015 |
| 2019/0348027 A1* | 11/2019 | Berenzweig | G10L 15/063 |
| 2019/0362709 A1* | 11/2019 | Agrawal | G10L 15/22 |
| 2019/0371311 A1* | 12/2019 | Patel | G06F 3/167 |
| 2019/0392348 A1* | 12/2019 | Ando | G10L 25/63 |
| 2020/0058299 A1* | 2/2020 | Lee | G06F 3/167 |
| 2020/0135184 A1* | 4/2020 | Chao | G10L 15/197 |

FOREIGN PATENT DOCUMENTS

| | | |
|---|---|---|
| JP | 2008-203469 | 9/2008 |
| KR | 2006-0087585 | 8/2006 |
| KR | 2016-0030168 | 3/2016 |
| KR | 2018-0074210 | 7/2018 |

OTHER PUBLICATIONS

Korean Office Action dated Jul. 29, 2020 issued in Application 10-2018-0104694.

\* cited by examiner

SERVER FOR PROVIDING VOICE RECOGNITION SERVICE

CROSS-REFERENCE TO RELATED APPLICATION

This application is based on and claims priority under 35 U.S.C. § 119 to Korean Patent Application No. 10-2018-0104694, filed Sep. 3, 2018, in the Korean Intellectual Property Office, the disclosure of which is incorporated by reference herein its entirety.

BACKGROUND

1. Field

The present disclosure relates to a server for providing a voice recognition service to a plurality of electronic devices in which the server may provide a voice recognition model customized to a user of each of the electronic devices.

2. Background

Artificial Intelligence (AI) is a field of a computer engineering and an information technology that studies a method for allowing a computer to do something that human intelligence may do such as thinking, learning, self-development, and the like. Thus, the Artificial Intelligence (AI) may mean allowing the computer to imitate an intelligent human behavior.

The Artificial Intelligence may not exist by itself, and may be directly or indirectly related to other fields of computer science. In the modern age, there are many attempts to introduce the Artificial Intelligence in various fields in information technology for solving problems in the fields.

A context awareness technology in which the Artificial Intelligence recognizes a user situation, and provides desired information to the user in a desired form may be actively researched. Context awareness is the ability of a system to gather information about its environment at any given time and adapt behaviors accordingly.

As the context awareness technology develops, a demand for a system capable of performing a function adapted to the user situation increases.

A voice recognition system that combines a user's voice recognition technology and a context awareness technology, and provides various operations and functions to the user via the voice recognition is increasing.

Voice recognition may refer to converting a voice signal to a character string or identifying linguistic semantic content by interpreting the voice signal and combining the interpreted voice signal to a patterned database.

In the voice recognition technology, a voice recognition model may analyze received voice data, extract features, and then measure a similarity with a voice model database that has been collected in advance to convert the most similar into a character or instruction.

Voice recognition technology is a kind of a pattern recognition process. Since a voice, pronunciation, intonation, and/or the like differ from person to person, a conventional voice recognition technology may collect voice data from as many people as possible, extract common features therefrom, and generate a reference pattern.

A voice recognition model based on the Artificial Intelligence such as deep learning, and/or the like may evolve while continuously learning.

A method may be applied in which a server equipped with a voice recognition model provides a voice recognition service to a plurality of electronic devices, and collects voice data from a large number of users. The voice recognition model may be applied to the plurality of electronic devices all-at-once after learning the voice data collected from the large number of users.

However, since voice patterns based on a gender, age, region, and/or the like may differ from user to user, when one voice recognition model that learned the voice data collected from all of the users is updated for all of the users all-at-once, a performance of the voice recognition service may deteriorate for a specific user.

BRIEF DESCRIPTION OF THE DRAWINGS

Embodiments may be described in detail with reference to the following drawings in which like reference numerals refer to like elements, and wherein.

DETAILED DESCRIPTION

Hereinafter, reference may now be made in detail to embodiments described herein, examples of which are illustrated in the accompanying drawings. The same reference numbers may be used throughout the drawings to refer to the same or like parts, and repeated description of the same or like parts may be omitted. Suffixes "module" and "unit" that are mentioned in the elements used in the following description are merely used individually or in combination for the purpose of simplifying the description of the present disclosure. Therefore, the suffix itself may not be used to differentiate the significance or function or the corresponding term. Further, in the description of the embodiment described herein, any specific description about functions or constructions that is well known in related arts may be omitted, when such a description is likely to obscure the gist of the embodiment described herein. Further, the accompanying drawings are only for the purpose of allowing the embodiment as disclosed herein to be understood easily, and are not to be construed as limiting the spirit of the present disclosure. The present disclosure is intended to cover not only the exemplary embodiments, but also various alternatives, modifications, equivalents and other embodiments that may be included within the spirit and scope of the present disclosure.

Although the terms first, second, etc. may be used herein to describe various components, these components should not be limited by these terms. These terms are only used to distinguish one component from another.

It will be understood that when a component is referred to as being "connected to", or "coupled to" another component, it can be directly on, connected to, or coupled to the other component, or one or more intervening components may be present. In contrast, when a component is referred to as being "directly connected to" or "directly coupled to" another component or layer, there are no intervening components present.

As used herein, the singular forms "a," "an," and "the" are intended to include the plural forms as well, unless the context clearly indicates otherwise. It should be understood that the terms "comprises," "comprising," "includes," and "including," when used in this specification, specify the presence of the stated features, integers, steps, operations, elements, components, or combinations thereof, but do not preclude the presence or addition of one or more other features, integers, steps, operations, elements, components, or combinations thereof.

Figure 1:
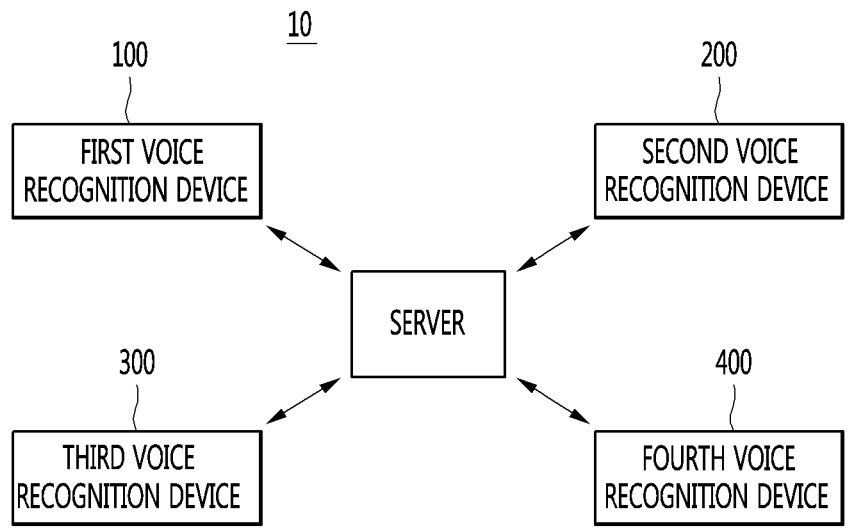
FIG. 1 is a diagram for illustrating a voice recognition system according to an embodiment of the present disclosure.

FIG. 1 is a diagram for illustrating a voice recognition system according to an embodiment of the present disclosure. Other embodiments and configurations may also be provided.

A voice recognition system 10 according to an example embodiment of the present disclosure may include a plurality of voice recognition devices 100, 200, 300, and 400 and a server 500 for providing the voice recognition service.

Providing the voice recognition service may mean that the server 500 provides voice recognition models or voice recognition results to the plurality of voice recognition devices 100, 200, 300, and 400 such that the plurality of voice recognition devices 100, 200, 300, and 400 receiving voice data from users perform functions corresponding to the received voice data.

In a first example, the server 500 may receive the voice data from the plurality of voice recognition devices 100, 200, 300, and 400 to allow the voice recognition models to learn the voice data. The server 500 may then transmit the learned voice recognition models to the plurality of voice recognition devices 100, 200, 300, and 400. In this example, the plurality of voice recognition devices 100, 200, 300, and 400 may receive the voice data from the users, and input the received voice data to the voice recognition models to output linguistic meaning of the received voice data (i.e., the voice recognition results). The plurality of voice recognition devices 100, 200, 300, and 400 may then perform functions corresponding to the voice recognition results.

In a second example, the server 500 may receive the voice data from the plurality of voice recognition devices 100, 200, 300, and 400 to allow the voice recognition models to learn the voice data. The plurality of voice recognition devices 100, 200, 300, and 400 may then receive the voice data from the users, and transmit the received voice data to the server 500. In this example, the server 500 may input the received voice data to the voice recognition models to output the voice recognition results, and transmit the output voice recognition results to the plurality of voice recognition devices 100, 200, 300, and 400. The plurality of voice recognition devices 100, 200, 300, and 400 may then perform functions corresponding to the voice recognition results.

The following explains the present disclosure in accordance with the second example, but is not limited thereto. The present disclosure may also be applied to the first example, which is an embodiment in which the server transmits the updated voice recognition models to the plurality of voice recognition devices.

The plurality of voice recognition devices 100, 200, 300, and 400 may communicate with the server 500. More specifically, the plurality of voice recognition devices 100, 200, 300, and 400 may provide an interface for connecting the plurality of voice recognition devices 100, 200, 300, and 400 to a wired/wireless network including an internet network. The plurality of voice recognition devices 100, 200, 300, and 400 may transmit or receive data with the server via a connected network or another network linked to the connected network.

The plurality of voice recognition devices 100, 200, 300, and 400 may learn the voice data in various ways or perform the functions corresponding to the voice data.

In one example, the voice recognition models may be provided (or mounted) in the server 500. Information at the voice recognition models may be stored in the server. Additionally, the plurality of voice recognition devices 100, 200, 300, and 400 may receive the voice data and transmit the voice data to the server 500. In this example, the server 500 may learn the voice data or output the recognition results of the voice data, and transmit the learned voice data or the recognition results to the plurality of voice recognition devices 100, 200, 300 and 400. The plurality of voice recognition devices 100, 200, 300, and 400 may then generate control commands corresponding to recognition results and perform control.

In another example, the voice recognition models may be provided (or mounted) in the server 500. Additionally, the plurality of voice recognition devices 100, 200, 300, and 400 may receive the voice data and transmit the voice data to the server 500. In this example, the server 500 may learn the voice data or output the recognition results of the voice data, and transmit the control commands corresponding to the recognition results to the plurality of voice recognition devices 100, 200, 300 and 400.

In another example, the voice recognition models may be provided (or mounted) in the plurality of voice recognition devices 100, 200, 300, and 400. Additionally, the plurality of voice recognition devices 100, 200, 300, and 400 may receive the voice data, learn the received voice data and/or output the recognition results of the voice data, and transmit the learned voice data or the recognition results to the server 500. The server 500 may then transmit the control commands corresponding to the recognition results to the plurality of voice recognition devices 100, 200, 300, and 400

The plurality of voice recognition devices 100, 200, 300 and 400 may independently perform an artificial intelligence function regardless of the server 500.

For example, the voice recognition models may be provided (or mounted) in the plurality of voice recognition devices 100, 200, 300, and 400 and the plurality of voice recognition devices 100, 200, 300, and 400 may receive the voice data, learn the received voice data and/or output the recognition results of the voice data, and generate the control commands corresponding to the recognition results.

Figure 2:
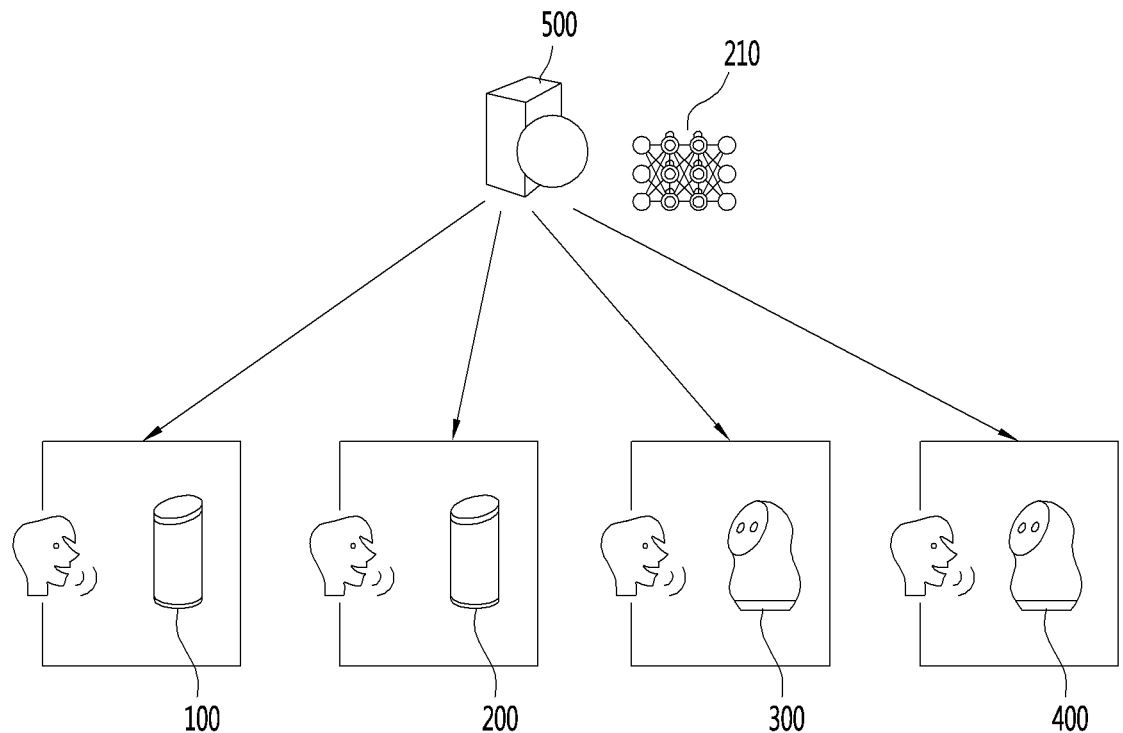
FIG. 2 is a diagram for illustrating a problem of a disadvantageous voice recognition system.

FIG. 2 is a diagram for illustrating a problem of a voice recognition system according to a disadvantageous arrangement.

The server 500 may communicate with the plurality of voice recognition devices 100, 200, 300 and 400, and provide the voice recognition service to the plurality of voice recognition devices 100, 200, 300 and 400.

An artificial intelligence-based voice recognition model 210 may exhibit better performance as the model 210 learns the voice data.

The voice recognition model 210 provided (or mounted) in or at the server 500 may learn the voice data received from the plurality of voice recognition devices 100, 200, 300 and 400, and may be updated. The server 500 may then provide the voice recognition service to the plurality of voice recognition devices 100, 200, 300, and 400 using the updated voice recognition model 210.

In one example, a user of the first voice recognition device 100 may be assumed to be a teenager/a female residing in Seoul, who has a very high satisfaction level about a recognition performance of the voice recognition model before the update.

A user of the second voice recognition device 200 may assumed to be in twenties/a male residing in Gangwon Province, who has a low satisfaction level about a recognition performance of the voice recognition model before the update.

A user of a third voice recognition device 300 may be assumed to be in thirties/a male residing in Gyeongsang-nam-do, who has a very low satisfaction level about a recognition performance of the voice recognition model before the update.

A user of a fourth voice recognition device 400 may be assumed to be a teenager/a male residing in Seoul, who has a high satisfaction level about a recognition performance of the voice recognition model before the update.

Since the user of the first voice recognition device 100 is different from the users of other voice recognition devices in terms of a gender, region, age, etc., an utterance pattern based on a difference in intonation and language habits, and/or the like may be different from other users.

However, when the voice recognition model 210 performs learning using the voice data from the users of the plurality of voice recognition devices 100, 200, 300 and 400, the learning may be performed by applying not only the utterance pattern of the user of the first voice recognition device 100 but also utterance patterns of other users. For example, although the user of the first voice recognition device 100 uses terms often used by teenage women in a standard language, the voice recognition model 210 may learn all the standard language and various dialects uttered by men and women in various age groups, and may be updated.

Additionally, when the server 500 applies the learned voice recognition model 210 to the plurality of voice recognition devices 100, 200, 300, and 400 all-at-once, an average voice recognition performance for the plurality of voice recognition devices 100, 200, 300, and 400 may increase. However, with regard to the user of the first voice recognition device 100, the voice recognition performance may be lowered.

Figure 3:
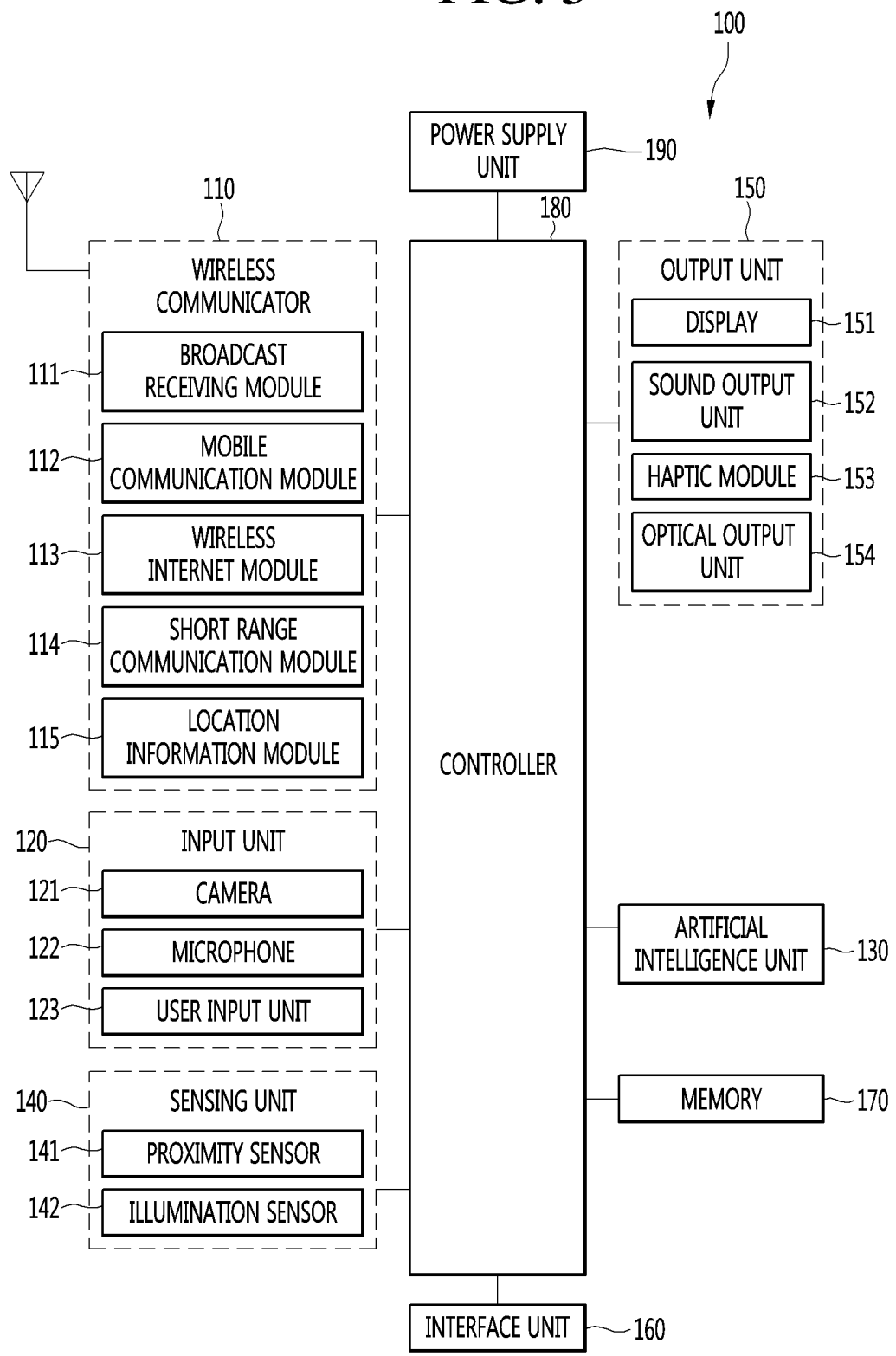
FIG. 3 is a block diagram for illustrating a voice recognition device according to an embodiment of the present disclosure.

FIG. 3 is a block diagram for illustrating a voice recognition device related to the present disclosure.

A terminal 100 may include a wireless communicator 110 (or communication device), an input unit 120, an artificial intelligence unit 130 (or artificial intelligence device), a sensing unit 140 (or sensing device), an output unit 150 (or output device), an interface unit 160 (or interface), a memory 170, a controller 180 and a power supply unit 190 (or power supply). The controller 180 may be a hardware component.

The components shown in FIG. 3 may not be essential for implementing the voice recognition device 100 such that the voice recognition device 100 described herein may have more or fewer components than the components listed above.

More specifically, the wireless communicator 110 (among the above-mentioned components) may include at least one module that enables a wireless communication between the voice recognition device 100 and a wireless communication system, between the voice recognition device 100 and another voice recognition device 100, and/or between the voice recognition device 100 and an external server. The wireless communicator 110 may include at least one module that connects the voice recognition device 100 to at least one network.

The wireless communicator 110 may include at least one of a broadcasting receiving module 111, a mobile communication module 112, a wireless internet module 113, a short-range communication module 114, and/or a location information module 115.

The input unit 120 may include a camera 121 (or an image input unit for an image signal input), a microphone 122 (or an audio input unit for receiving an audio signal), and a user input unit 123 (e.g., a touch key, a push key (a mechanical key), and the like) for receiving information from the user. The voice data or image data collected from the input unit 120 may be analyzed and processed by a user's control command.

The artificial intelligence unit 130 (or artificial intelligence device) may process information based on an artificial intelligence technology. The artificial intelligence unit 130 may include at least one module that performs at least one of learning of information, inferring of information, perceiving of information, and/or processing of natural language. The artificial intelligence unit 130 may be controller.

The artificial intelligence unit 130 may use a machine learning technology to perform at least one of learning, inferring, and/or processing a large amount of information (big data) such as information stored in the voice recognition device, surrounding environment of the voice recognition device, information stored in a communicable external memory, and the like. The artificial intelligence unit 130 may predict (or infer) at least one feasible operation of the voice recognition device using the information learned using the machine learning technology, and control the voice recognition device such that the most feasible operation among the at least one predicted operations is performed.

The machine learning technology is a technology that collects and learns a large amount of information based on at least one algorithm, and judges and predicts information based on the learned information. The learning of information is an operation to grasp features, rules, standards of judgment, and/or the like of information, quantify relations between information and information, and predict new data using quantified patterns.

The algorithm used by such machine learning technique may be a statistical based algorithm. For example, the algorithm may be a decision tree using a tree structure as a prediction model, a neural network that mimics neural network structures and functions of living things, a genetic programming based on a biological evolutionary algorithm, a clustering for distributing observed examples into subsets of clusters, a Monte Carlo method that stochastically calculates a function value using randomly extracted random numbers, and/or the like.

In a field of the machine learning technology, the deep learning technology is a technology that performs at least one of learning, judging, and/or processing of information using the artificial neural network algorithm. The artificial neural network may have a structure in which layers are interconnected to each other, and data communicates between the layers. This deep learning technique may learn vast amount of information via the artificial neural network using a graphic processing unit (GPU) optimized for a parallel computing.

The artificial intelligence unit 130 may collect (sense, monitor, extract, detect, receive) a signal, data, information, and/or the like to input to or output from components of the voice recognition device in order to collect vast amount of information for applying the machine learning technology. The artificial intelligence unit 130 may collect (sense, monitor, extract, detect, and receive) data, information, and/or the like stored in an external memory (e.g., a cloud server) connected via communication. More specifically, the collection of information may be understood to include operations of sensing information via a sensor, extracting information stored in the memory 170, and/or receiving information from the external memory via communication.

The artificial intelligence unit 130 may sense information in the voice recognition device, information about surrounding environment of the voice recognition device, and user information through the sensing unit 140. The artificial intelligence unit 130 may receive the broadcasting signal and/or the broadcasting related information, the wireless signal, and the wireless data through the wireless communicator 110. The artificial intelligence unit 130 may receive the image information (or signal), the audio information (or signal), the data, and/or information input from the user through the input unit.

The artificial intelligence unit 130 may collect a large amount of information on a background in real time, learn the collected information, process the learned information in a proper form, and store the processed information (e.g., a knowledge graph, a command policy, a customized database, a dialog engine, etc.) in the memory 170.

When an operation of the voice recognition device is predicted based on the learned information using the machine learning technology, the artificial intelligence unit 130 may control the components of the voice recognition device to perform the predicted operation or may transmit a control command for performing the predicted operation to the controller 180 to perform the predicted operation. The controller 180 may control the voice recognition device based on the control command, and perform the predicted operation.

When a specific operation is performed, the artificial intelligence unit 130 may analyze history information indicating an execution of the specific operation through the machine learning technique, and update previously learned information based on the analyzed information. Thus, the artificial intelligence unit 130 may improve an accuracy of the information prediction.

The artificial intelligence unit 130 and the controller 180 may be understood as the same components. In this example, a function performed in the controller 180 explained herein may be expressed as being performed in the artificial intelligence unit 130. Additionally, the controller 180 may be referred to as the artificial intelligence unit 130 or conversely the artificial intelligence unit 130 may be referred to as the controller 180.

Alternatively, the artificial intelligence unit 130 and the controller 180 may be understood as separate components. In this example, the artificial intelligence unit 130 and the controller 180 may perform various controls on the voice recognition device through exchanging data with each other. The controller 180 may perform at least one function on the voice recognition device and/or may control at least one of the components of the voice recognition device based on results derived from the artificial intelligence unit 130. Moreover, the artificial intelligence unit 130 may also operate under control of the controller 180.

The sensing unit 140 may include at least one sensor for sensing at least one of information in the voice recognition device, information about surrounding environment of the voice recognition device, and/or user information.

For example, the sensing unit 140 may include at least one of a proximity sensor 141, an illumination sensor 142, a touch sensor, an acceleration sensor, a magnetic sensor, a gravity sensor (G-sensor), a gyroscope sensor, a motion sensor, an RGB sensor, an infrared sensor (IR sensor), a finger scan sensor, an ultrasonic sensor, an optical sensor (e.g., see the camera 121), a microphone (see microphone 122), a battery gauge, an environment sensor (e.g., a barometer, a hygrometer, a thermometer, a radiation sensor, a heat sensor, a gas sensor, etc.), and/or a chemical sensor (e.g. an electronic nose, a healthcare sensor, a biometric sensor, etc.). The voice recognition device disclosed herein may combine and utilize information sensed by at least two of the sensors.

The output unit 150 may generate an output related to a sense of sight, a sense of hearing, a sense of touch, and/or the like. The output unit 150 may include at least one of a display 151, a sound output unit 152, a haptic module 153, and/or an optical output unit 154. The display 151 may form a mutual layer structure with the touch sensor, and/or may be integrally formed with the touch sensor to realize a touch screen. The touch screen may function as the user input unit 123 that provides the input interface between the terminal 100 and the user, and at the same time provides an output interface between the voice recognition device 100 and the user.

The interface unit 160 (or interface) may serve as a path with various types of the external devices connected to the voice recognition device 100. The interface unit 160 may include at least one of a wired/wireless headset port, an external charger port, a wired/wireless data port, a memory card port, a port for connecting a device having an identification module, an audio I/O (Input/Output) port, video I/O (Input/Output) port, and/or an earphone port. In the voice recognition device 100, corresponding to the connection of the external device to the interface unit 160, a proper control with respect to the connected external device may be performed.

The memory 170 may store therein data supporting various functions of the voice recognition device 100. The memory 170 may store therein a plurality of application programs or applications running on the terminal 100, data for the operation of the voice recognition device 100, instructions, and data for the operation of the artificial intelligence unit 130 (e.g., at least one algorithm information for the machine learning, or the like). At least some of these application programs may be downloaded from the external server via the wireless communication. Further, at least some of these application programs may reside on the voice recognition device 100 from a release date for basic functions (e.g., receiving and sending a call, receiving and sending a message) of the voice recognition device 100. The application program may be stored in the memory 170, provided on the voice recognition device 100, and operated by the controller 180 to perform the operation (or function) of the voice recognition device.

In addition to operations associated with the application program, the controller 180 typically controls an overall operation of the voice recognition device 100. The controller 180 may process a signal, data, information, etc., input and/or output through the components discussed above, and/or may drive an application program stored in the memory 170 to provide or process information or a function suitable for the user.

The controller 180 may control at least some of the components shown in FIG. 3 to drive the application program stored in the memory 170. The controller 180 may operate at least two of the components included in the voice recognition device 100 in combination with each other for driving the application program.

The power supply unit 190 may receive external power and internal power under the control of the controller 180 to supply power to each component of the voice recognition device 100. The power supply unit 190 may include a battery, which may be an internal battery or a replaceable battery.

Before describing the various embodiments implemented via the voice recognition device 100 as described above, the above listed components may be more specifically described with reference to FIG. 3.

First, referring to the wireless communicator 110, the broadcasting receiving module 111 of the wireless communicator 110 receives a broadcasting signal and/or broadcasting-related information from an external broadcasting managing server via a broadcasting channel. The broadcasting channel may include a satellite channel and a terrestrial channel. At least two broadcasting receiving modules may be provided to the voice recognition device 100 for simultaneous broadcasting reception or broadcasting channel switching of at least two broadcasting channels.

The broadcasting managing server may refer to a server for generating and transmitting the broadcasting signal and/or the broadcasting-related information, or a server for receiving the broadcasting signal and/or broadcasting-related information previously generated, and transmitting to the terminal. The broadcasting signal may include not only a TV broadcasting signal, a radio broadcasting signal, a data broadcasting signal, but also a broadcasting signal in which the data broadcasting signal is combined with the TV broadcasting signal or the radio broadcasting signal.

The broadcasting signal may be encoded based on at least one of technical standards (or a broadcasting method, for example, ISO, IEC, DVB, ATSC, etc.) for transmitting and receiving a digital broadcasting signal. In addition, the broadcasting receiving module 111 may receive the digital broadcasting signal using a method conforming to technical specifications defined in the technical standards.

The broadcasting-related information may refer to information related to a broadcasting channel, a broadcasting program, or a broadcasting service provider. The broadcasting-related information may also be provided via a mobile communication network. In this example, the broadcasting-related information may be received by the mobile communication module 112.

The broadcasting-related information may be provided in various forms such as an Electronic Program Guide (EPG) of a Digital Multimedia Broadcasting (DMB), an Electronic Service Guide (ESG) of a Digital Video Broadcast-Handheld (DVB-H), or the like. The broadcasting signal and/or broadcasting-related information received via the broadcasting receiving module 111 may be stored in the memory 170.

The mobile communication module 112 may transmit and receive a wireless signal to and from at least one of a base station, an external terminal, or a server on a mobile communication network constructed based on technical standards or communication methods for a mobile communication (e.g., a Global System for Mobile communication (GSM), a Code Division Multi Access (CDMA), a Code Division Multi Access 2000 (CDMA2000), an Enhanced Voice-Data Optimized or Enhanced Voice-Data Only (EV-DO), a Wideband CDMA (WCDMA), a High Speed Downlink Packet Access (HSDPA), a High Speed Uplink Packet Access (HSUPA), a Long Term Evolution (LTE), a Long Term Evolution-Advanced (LTE-A), and the like).

The wireless signal may include various types of data based on a voice calling signal, a videotelephony calling signal, or a text/multimedia message transmission/reception.

The wireless internet module 113 is a module for a wireless internet access, and may be mounted internal or external to the voice recognition device 100. The wireless internet module 113 is configured to transmit and receive the wireless signal in a communication network based on wireless internet technologies.

The wireless internet technologies may include, for example, a wireless LAN (WLAN), a wireless fidelity (Wi-Fi), a Wi-Fi (Wireless Fidelity) Direct, a Digital Living Network Alliance (DLNA), a Wireless Broadband (WiBro), a World Interoperability for Microwave Access (WiMAX), a High Speed Downlink Packet Access (HSDPA), a High Speed Uplink Packet Access (HSUPA), a Long Term Evolution (LTE), a Long Term Evolution-Advanced (LTE-A), and the like. The wireless internet module 113 may transmit and receive data based on at least one wireless Internet technology including internet technologies not listed above.

The wireless internet access over WiBro, HSDPA, HSUPA, GSM, CDMA, WCDMA, LTE, LTE-A, and the like may be realized over a mobile communication network. Thus, the wireless Internet module 113 that performs the wireless Internet access over the mobile communication network may be understood as a kind of the mobile communication module 112.

The short-range communication module 114 is for a short-range communication, and may support the short-range communication using at least one technology of a Bluetooth™, a Radio Frequency Identification (RFID), an Infrared Data Association (IrDA), an Ultra Wideband (UWB), a ZigBee, a Near Field Communication (NFC), a Wireless-Fidelity (Wi-Fi), a Wi-Fi Direct, or a Wireless Universal Serial Bus (Wireless USB). The short-range communication module 114 may support wireless communication between the voice recognition device 100 and the wireless communication system, between the voice recognition device 100 and another voice recognition device 100, and/or between the voice recognition device 100 and a network where another voice recognition device 100 (or the external server) is located via wireless area networks. The wireless local area network may be a wireless personal area network.

Another voice recognition device 100 may be a wearable device (e.g., a smartwatch, a smart glass, a head mounted display (HMD)) capable of interchanging data with the voice recognition device 100 according to the present disclosure. The short-range communication module 114 may sense (or recognize) the wearable device capable of communicating with the voice recognition device 100, around the voice recognition device 100. Further, when the sensed wearable device is an authorized device for communicating with the voice recognition device 100 according to the present disclosure, the controller 180 may transmit at least a portion of the data processed in the voice recognition device 100 to the wearable device via the short-range communication module 114. Therefore, a user of the wearable device may use the data processed by the voice recognition device 100 via the wearable device. For example, through this, when the voice recognition device 100 receives a call, the user may answer the call via the wearable device. Further, when the voice recognition device 100 receives a message, the user may check the received message via the wearable device.

The location information module 115 is a module for acquiring a location (or a current location) of the voice recognition device. As a representative example thereof, there is a Global Positioning System (GPS) module or a Wireless Fidelity (WiFi) module. For example, when using the GPS module, the voice recognition device may acquire the location thereof using a signal from a GPS satellite.

As another example, upon utilizing a Wi-Fi module, the voice recognition device may acquire the location of the voice recognition device based on information of a wireless access point (AP) that transmits or receives a wireless signal to or from the Wi-Fi module. The location information module 115 may perform the function of any of the other modules of the wireless communicator 110 to obtain data regarding the location of the voice recognition device, either alternatively or additionally. The location information module 115 may be a module used to obtain the location (or current location) of the voice recognition device, and is not limited to a module that directly calculates or obtains the location of the voice recognition device.

The input unit 120 is for inputting the image information (or signal), the audio information (or signal), the data, or information input from the user. The voice recognition device 100 may include the one or the plurality of cameras 121 for inputting the image information. The camera 121 may process, in a videotelephony mode or a capturing mode, image frames of still images, moving images, or the like obtained by an image sensor. The processed image frame may be displayed on the display 151 or stored in the memory 170. Further, the plurality of cameras 121 provided in the voice recognition device 100 may be arranged in a matrix structure. Image information having various angles or foci may be input to the voice recognition device 100 via the cameras 121 in the matrix structure. The plurality of cameras 121 may be arranged in a stereo structure to obtain a left image and a right image for implementing a stereoscopic image.

The microphone 122 may process an external sound signal into electrical voice data. The processed voice data may be utilized variously based on a function being performed (or an application program being executed) in the voice recognition device 100. The microphone 122 may be implemented with various noise elimination algorithms for eliminating a noise generated in receiving the external sound signal.

The user input unit 123 may be for receiving the information from the user. When the information is input through the user input unit 123, the controller 180 may control an operation of the voice recognition device 100 to correspond to the input information. The user input unit 123 may include mechanical input means (or a mechanical key, e.g., a button, a dome switch, a jog wheel, a jog switch, and the like located at a front/rear face or side face of the voice recognition device 100) and touch-type input means. As an example, the touch-type input means may include a virtual key, a soft key, and/or a visual key displayed on a touch screen through software processing, or a touch key disposed on a portion other than the touch screen. Further, the virtual key or the visual key may be displayed on the touch screen with various forms. For example, the virtual key or the visual key may include a graphic, a text, an icon, a video, or combinations thereof.

The sensing unit 140 may sense at least one of the information in the voice recognition device, the surrounding environment of the voice recognition device, or the user information, and may generate a sensing signal corresponding to the sensed information. The controller 180, based on the sensing signal, may control the drive or operation of the voice recognition device 100 and/or may perform data processing, function or operation related to the application program installed in the voice recognition device 100. Representative sensors among various sensors that may be included in the sensing unit 140 may now be described in more detail.

First, the proximity sensor 141 may refer to a sensor that senses a presence of an object approaching a predetermined sensing face or a nearby object using a force of an electromagnetic field, an infrared ray, or the like without a mechanical contact. The proximity sensor 141 may be disposed in an interior region of the voice recognition device covered by the touch screen described above, or disposed in proximity to the touch screen.

Examples of the proximity sensor 141 include a transmission-type photoelectric sensor, a direct reflective-type photoelectric sensor, a mirror reflective-type photoelectric sensor, a high-frequency oscillation-type proximity sensor, a capacitive-type proximity sensor, a magnetic-type proximity sensor, an infrared proximity sensor, and the like. When the touch screen is an electrostatic touch screen, the proximity sensor 141 may be configured to sense a proximity of a conductive object in associated with a change in the electric field depending on a proximity change of the conducive object. In this example, the touch screen (or the touch sensor) itself may be classified as the proximity sensor.

For ease of description, a scheme in which when an object is in close proximity to but in non-contact with the touch screen, the object location above the touch screen is recognized may be referred to as a "proximity-touch". Additionally, a scheme in which an object is in direct contact with the touch screen may be referred to as a "contact-touch". A position of the object when the object is proximity-touched above the touch screen may mean a vertical position relative to the touch screen. The proximity sensor 141 may sense the proximity-touch and a proximity-touch pattern (e.g., a proximity-touch distance, a proximity-touch direction, a proximity-touch speed, a proximity-touch time, a proximity-touch position, a proximity-touch movement state, and the like).

As described above, the controller 180 may process data (or information) corresponding to the proximity touch operation and the proximity touch pattern sensed via the proximity sensor 141. Moreover, the controller 180 may output visual information corresponding to the processed data on the touch screen. Furthermore, the controller 180 may control the voice recognition device 100 such that an operation or data (or information) to be processed may vary based on whether a touch to the same point on the touch screen is the proximity touch or the contact touch.

The touch sensor may sense a touch (or touch input) applied to the touch screen (or the display 151) using at least one of various touch methods such as a resistive film type, capacitive type, infrared type, ultrasonic type, magnetic field type, or the like.

In one example, the touch sensor may be configured to convert a change in a pressure applied to a specific portion of the touch screen or in a capacitance occurring at a specific portion, or the like into an electrical input signal. The touch sensor may detect location and area where a touching object touching the touch screen touches the touch sensor, a pressure at the time of touch, a capacitance at the time of touch, and the like. In this connection, the touching object may be an object for applying a touch to the touch sensor, and may include a finger, a touch pen or stylus pen, a pointer, and the like.

When there is the touch input to the touch sensor, a corresponding signal(s) is sent to a touch controller. The touch controller may process the signal (s), and transmit corresponding data to the controller 180. Thus, the controller 180 may grasp which region of the display 151 is touched, and/or the like. In this connection, the touch controller may be a component separate from the controller 180, and may be the controller 180 itself.

The controller 180 may perform different controls or perform the same control depending on a type of the touch object touching the touch screen (or the touch key provided on the touch screen). Whether to perform different controls or perform the same control depending on the type of the touch object may be determined based on an operation state of the current voice recognition device 100 or an application program being executed.

The touch sensor and the proximity sensor described above may, independently or in combination with each other, sense various kinds of touches such as a short touch (or tap touch), a long touch, a multi touch, a drag touch, a flick touch, a pinch-in touch, a pinch-out touch, a swipe touch, a hovering touch, and/or the like to the touch screen.

The ultrasonic sensor may recognize a position information of an object to be sensed using an ultrasonic wave. The controller 180 may calculate a position of a wave source through information sensed from the optical sensor and a plurality of ultrasonic sensors. The position of the wave source may be calculated using a fact that light is faster much faster than ultrasonic wave That is, the time required for the light to reach the optical sensor is much shorter than the time required to the ultrasonic wave to reach the ultrasonic sensor. More specifically, a location of a wave source may be calculated based on a difference between an arrival time of light and an arrival time of an ultrasonic wave.

The camera 121 acting as the input unit 120 may include at least one of a camera sensor (e.g., a CCD, a CMOS, etc.), a photo sensor (or an image sensor), and a laser sensor. The camera 121 and the laser sensor may be combined with each other to sense a touch of an object-to-be-sensed to a three-dimensional stereoscopic image. The photosensor may be stacked on a display element. The photosensor may scan a movement of the object-to-be-sensed proximity to the touch screen. More specifically, the photosensor may mount a photo diode and a transistor (TR) in a row/column, and scan contents placed on the photosensor using an electrical signal that changes based on an amount of light applied to the photo diode. That is, the photo sensor may perform coordinate calculation of the object-to-be-sensed based on the amount of change of the light. Thus, the position information of the object-to-be-sensed may be obtained.

The display 151 may display (outputs) information processed by the voice recognition device 100. For example, the display 151 may display execution screen information of an application program driven by the voice recognition device 100, or UI (User Interface) and GUI (Graphic User Interface) information based on this execution screen information.

The display 151 may be a stereoscopic display for displaying a stereoscopic image. A three-dimensional display method such as a stereoscopic method (spectacles method), an autostereoscopic method (non-spectacle method), a projection method (holographic method), and the like may be applied to the stereoscopic display.

The three-dimensional stereoscopic image is constituted by a left image (an image for a left eye) and a right image (an image for a right eye). A method for combining the left image and the right image includes: a top-down method for arranging the left and right images up and down in one frame; a left-to-right (L-to-R) (or side-by-side) method for arranging the left and right images left and right in one frame; a checker board method for arranging pieces of the left and right images in a form of a tile; an interlaced method for arranging the left and right images alternately on a column or row basis; and a time sequential (frame by frame) method for displaying the left and right images alternately per time, and the like.

A left image thumbnail and a right image thumbnail may be respectively generated from the left image and the right image of an original image frame, and may be combined with each other to generate a three-dimensional thumbnail image, which is a single image. The thumbnail may mean a reduced image or a reduced still image. The left and right image thumbnails thus generated may be displayed on the screen to be horizontally spaced from each other by a depth corresponding to a parallax between the left image and the right image. This may result in a three-dimensional sense.

The left image and the right image necessary for the implementation of the three-dimensional stereoscopic image may be displayed on the stereoscopic display by a stereoscopic processing unit. The stereoscopic processing unit may receive a 3D image (an image at a reference time point and an image at an expansion time point) and set a left image and a right image therefrom, or receive a 2D image and convert the 2D image into a left image and a right image.

The sound output unit 152 may output audio data received from the wireless communicator 110 or stored in the memory 170 in a calling signal reception mode, a calling mode or a recording mode, a voice recognition mode, a broadcasting reception mode, and the like. The sound output unit 152 may also output a sound signal (e.g., a calling signal reception tone, a message reception tone, etc.) related to the function performed in the voice recognition device 100. The sound output unit 152 may include a receiver, a speaker, a buzzer, and the like.

The haptic module 153 may generate various haptic effects that the user may feel. A representative example of the haptic effect generated by the haptic module 153 may be a vibration. An intensity and a pattern of the vibration generated in the haptic module 153 may be controlled by a user's selection or a setting of the controller. For example, the haptic module 153 may combine and output different vibrations or sequentially output the same.

In addition to the vibration, the haptic module 153 may generate various haptic effects such as effects resulting from a pin arrangement vertically moving with respect to a contact skin face, injection force or suction force of an air through an injection port or a suction port, brushing against the skin face, a contact of an electrode, stimulation such as electrostatic force, etc. and effects resulting from reproduction of thermal sense using endothermic or exothermic element, and the like.

The haptic module 153 may not only transmit the haptic effect via direct contact, but also may allow the user to feel the haptic effects via muscular sensation of fingers, arms, or the like. The haptic module 153 may include the number of haptic modules, where the number may be based on a configuration of the voice recognition device 100.

The optical output unit 154 may output a signal for notifying an occurrence of an event using a light of a light source of the voice recognition device 100. Examples of the event that occur at the voice recognition device 100 may include a message reception, a calling signal reception, a missed call, an alarm, a schedule notification, an email reception, an information reception via an application, and the like.

The signal output from the optical output unit 154 may be implemented when the voice recognition device emits light of a single color or a plurality of colors to front or rear face thereof. The signal output may be terminated when the voice recognition device detects an user's event check.

The interface unit 160 may serve as the path with various types of the external devices connected to the voice recognition device 100. The interface unit 160 may receive data or power from an external device and transmit the same to each component in the voice recognition device 100, or transmit data in the voice recognition device 100 to the external device. For example, the wired/wireless headset port, the external charger port, the wired/wireless data port, the memory card port, the port for connecting the device having the identification module, the audio I/O (Input/Output) port, the video I/O (Input/Output) port, the earphone port, and the like may be included in the interface unit 160.

The identification module may be a chip that stores various information for authenticating a usage right of the voice recognition device 100. The identification module may include a viewer identity module (UIM), a subscriber identity module (SIM), a universal subscriber identity module (USIM), and the like. A device equipped with the identification module (hereinafter referred to as an "identification device") may be manufactured in a form of the smart card. Therefore, the identification device may be connected to the voice recognition device 100 via the interface unit 160.

Further, when the voice recognition device 100 is connected to an external cradle, the interface unit 160 may serve as a path through which power from the cradle is supplied to the voice recognition device 100, or a path through which various command signals input to the cradle by the user are transmitted to the voice recognition device 100. The various command signals or the power from the cradle may be operated as a signal for recognizing that the voice recognition device 100 is correctly provided in the cradle (or mounted to the cradle).

The memory 170 may store a program for operation of the controller 180, and temporarily store input/output data (e.g., a phonebook, a message, a still image, a moving image, etc.). The memory 170 may store data on vibration and sound of various patterns output when the touch is input on the touch screen.

The memory 170 may include a memory medium at least one of a flash memory type, a hard disk type, a Solid State Disk (SSD) type, a Silicon Disk Drive (SDD) type, a multimedia card micro type, and a card type (e.g., SD or XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk, or an optical disk. The voice recognition device 100 may operate in association with a web memory that performs a storage function of the memory 170 on the internet.

As described above, the controller 180 may control operations associated with the application programs, and typically overall operations of the voice recognition device 100. For example, when a condition of the voice recognition device satisfies a predetermined condition, the controller 180 may activate or deactivate a lock state for restricting input of the user's control command for the applications.

The controller 180 may perform control and processing associated with a voice call, a data communication, a video call, etc., and/or may perform pattern recognition processing capable of recognizing handwriting input or drawing input performed on the touch screen as characters and images, respectively. Moreover, in order to implement various embodiments of the voice recognition device 100 according to the present disclosure to be described below, the controller 180 may control any one or combinations of the above components.

The power supply unit 190 receives external power and internal power under control of the controller 180 to supply power required for an operation of each component. The power supply unit 190 includes a battery, which may be an internal battery. The internal battery may be detachably coupled to a terminal body for charging, or the like.

The power supply unit 190 may have a connection port. The connection port may be an example of the interface 160 in which an external charger for supplying power is electrically connected to charge a battery.

As another example, the power supply unit 190 may not use the connection port, and charge the battery in a wireless manner. In this example, the power supply unit 190 may use at least one of an inductive coupling manner based on a magnetic induction phenomenon or a magnetic resonance coupling manner based on an electromagnetic resonance phenomenon to receive the power from an external wireless power transmission device.

Various embodiments may be embodied in a recording medium readable by a computer or similar device using, for example, software, hardware, and/or a combination thereof.

The controller 180 may control operation of each of the components of the mobile terminal 100 under control of the artificial intelligence unit 130.

The input unit 120 (of the mobile terminal 100) may include the sensing unit 140, and may perform all the functions performed by the sensing unit 140. For example, the input unit 120 may sense the user touch input.

Figure 4:
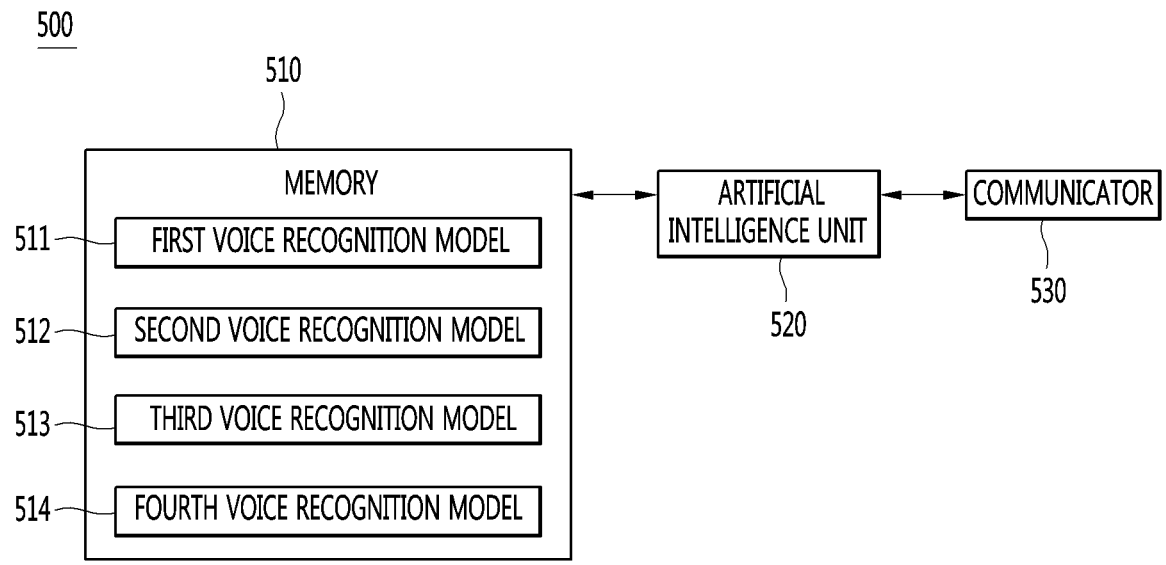
FIG. 4 is a block diagram for illustrating a server according to an embodiment of the present disclosure.

FIG. 4 is a block diagram showing a server 500 for providing a voice recognition service, according to an embodiment of the present disclosure. The server 500 may include a memory 510, an artificial intelligence unit 520 (or artificial intelligence device), and a communicator 530 (or communicator device). The memory 510 may store a plurality of voice recognition models 511, 512, 513, and 514.

The communicator 530 may communicate with an external device. More specifically, the communicator 530 may connect to the plurality of voice recognition devices 100, 200, 300 and 400, and may transmit or receive data to or from the plurality of voice recognition devices 100, 200, 300 and 400 under control of the artificial intelligence unit 520. The artificial intelligence unit 520 may receive voice data from the plurality of voice recognition devices 100, 200, 300, and 400 via the communicator 530.

A voice recognition unit 521 (FIG. 6) included in the artificial intelligence unit 520 may output recognition results of the voice data using the voice recognition models, and transmit the output recognition results or the control commands corresponding to the output recognition results to the plurality of voice recognition devices 100, 200, 300.

In this connection, the artificial intelligence unit 520 may input voice data of various categories to the machine learning models such as the artificial neural network, and the like to adaptively train the machine learning models respectively based on the various categories. Thus, the adaptively trained machine learning models may refer to the plurality of voice recognition models 511, 512, 513, and 514.

More specifically, the plurality of voice recognition models 511, 512, 513, and 514 may respectively correspond to a plurality of categories. The categories may be classified based on meta information about users of the voice recognition devices. The meta information may include at least one of a gender, age, and/or region.

In one example, the first voice recognition model 511 may be a voice recognition model in a category corresponding to twenties, female, and Seoul. In another example, the second voice recognition model 512 may be a voice recognition model in a category corresponding to thirties, male, and Gyeongsangnam-do. In another example, the third voice recognition model 513 may be a voice recognition model corresponding to sixties and Jeollabuk-do.

The plurality of voice recognition models may be respectively learned by voice data from the users respectively corresponding to the plurality of categories.

More specifically, the artificial intelligence unit 520 may control the first voice recognition model 511 to learn voice data from the users corresponding to the category of the first voice recognition model 511. When the learning is completed, the artificial intelligence unit 520 may update the learned first voice recognition model 511.

For example, the artificial intelligence unit 520 may provide voice data from women in their twenties residing in Seoul to the first voice recognition model 511 such that the first voice recognition model 511 may learn the voice data from the women in their twenties residing in Seoul. When the learning is completed, the artificial intelligence unit 520 may change the original first voice recognition model 511 to the learned first voice recognition model 511.

The artificial intelligence unit 520 may control the second voice recognition model 512 to learn voice data from the users corresponding to the category of the second voice recognition model 512. When the learning is completed, the artificial intelligence unit 520 may update the learned second voice recognition model 512.

For example, the artificial intelligence unit 520 may provide voice data from men in their thirties residing in Gyeongsangnam-do to the second voice recognition model 512 such that the second voice recognition model 512 may learn the voice data from the men in their thirties residing in Gyeongsangnam-do. When the learning is completed, the artificial intelligence unit 520 may change the original second voice recognition model 512 to the learned second voice recognition model 512.

The artificial intelligence unit 520 may use the voice recognition model to analyze a voice signal of the user (i.e., the voice data of the user) and extract a feature to extract the recognition result. The recognition result may be whether the received voice signal is an instruction or a non-instruction, or which instruction among a plurality of instructions the received voice signal means.

The instruction may be pre-registered such that the voice recognition device or another device connected to a voice recognition agent may perform a specific function. The non-instruction may be independent of a performance of a specific function.

The term memory 510 may be used interchangeably with the term memory.

The term artificial intelligence unit 520 may be used interchangeably with the terms artificial intelligence controller and artificial intelligence processor. The artificial intelligence unit 520 may also be called a controller (and/or a processor).

Figure 5:
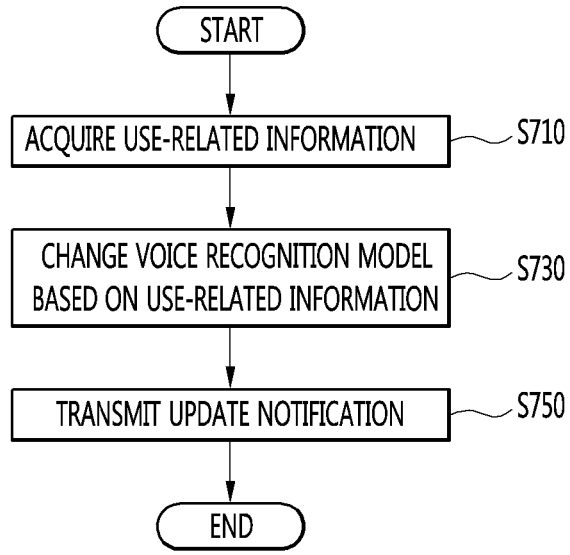
FIG. 5 is a diagram for illustrating a method for operating a server that provides a voice recognition service according to an embodiment of the present disclosure.

FIG. 5 is a diagram for illustrating a method for operating a server that provides a voice recognition service according to an embodiment of the present disclosure. Other embodiments and configurations may also be provided.

FIG. 5 shows a method for operating a server for providing a voice recognition service. This may include acquiring or obtaining use-related information regarding (or about) a voice recognition device S710, changing a voice recognition model corresponding to the voice recognition device from a first voice recognition model to a second voice recognition model based on the use-related information S730, and transmitting an update notification to the voice recognition device when the voice recognition model corresponding to the voice recognition device is changed S750.

The obtaining (or acquiring) of the use-related information about the voice recognition device S710 and the changing of the voice recognition model corresponding to the voice recognition device from the first voice recognition model to the second voice recognition model based on the use-related information S730 will be described with reference to FIG. 6.

Figure 6:
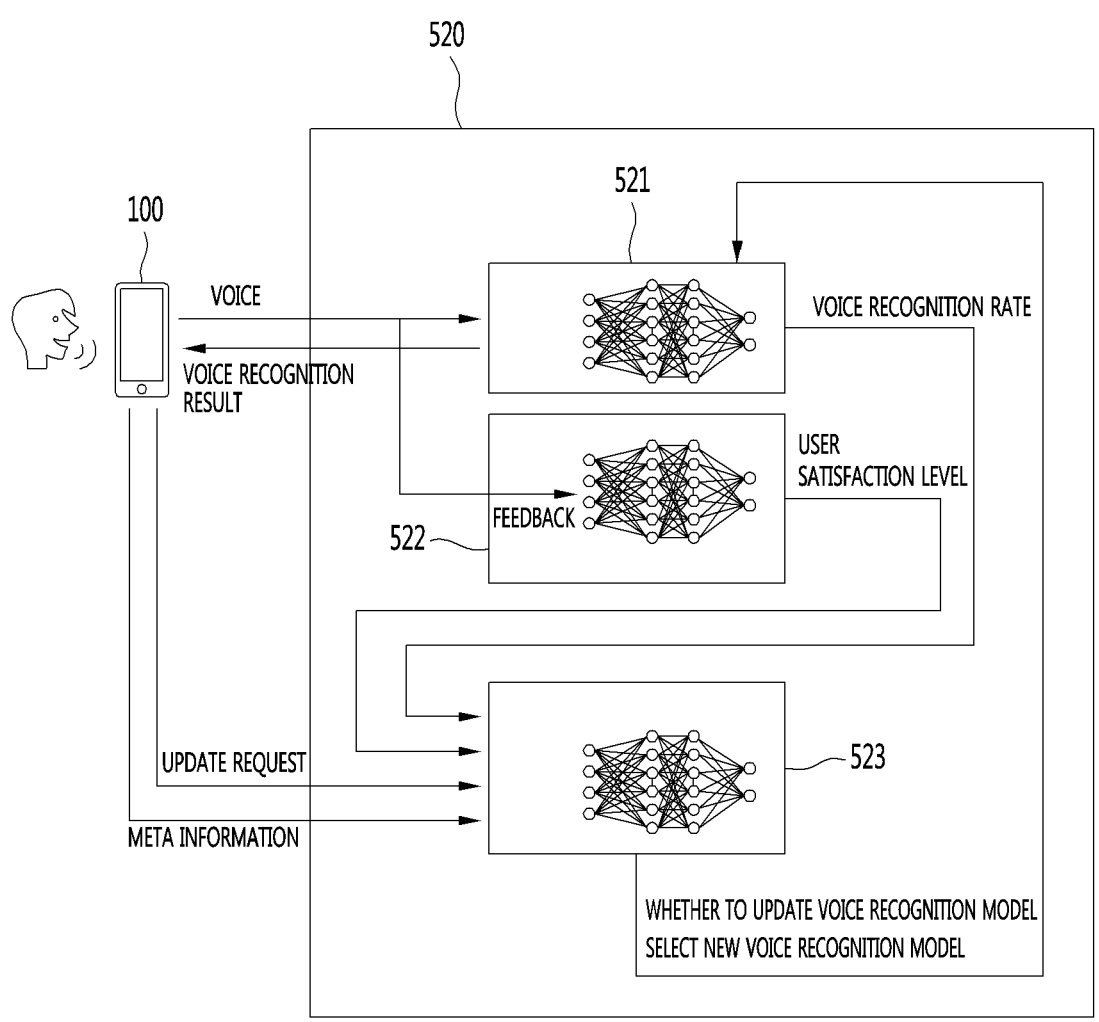
FIG. 6 is a diagram for illustrating a method for changing a voice recognition model using use-related information about a voice recognition device according to an embodiment of the present disclosure.

FIG. 6 is a diagram for illustrating a method for changing a voice recognition model using use-related information about (or regarding) a voice recognition device according to an embodiment of the present disclosure. Other embodiments and configurations may also be provided.

The artificial intelligence unit 520 may include the voice recognition unit 521 (or voice recognition device) for inputting the received voice data to the voice recognition model to output a recognition result of the received voice data, and obtaining a recognition performance of the voice recognition model, a satisfaction level extracting unit 522 for extracting a feedback from the user and obtaining a satisfaction level from the user, and a voice recognition model update unit 523 for determining whether to change the voice recognition model and a voice recognition model to be changed from the original voice recognition model based on the use-related information.

The voice recognition model corresponding to the voice recognition device may refer to a voice recognition model used to recognize the voice data (i.e., a voice signal) from the user received by the voice recognition device.

For example, the first voice recognition device may receive the voice data from the user and transmit the received voice data to the server 500. The server 500 may input the received voice data to the first voice recognition model to output the voice recognition result, and then transmit the output voice recognition result to the first voice recognition device. In this example, the voice recognition model corresponding to the first voice recognition device may be a first voice recognition model.

The use-related information may be data used to determine whether to change the voice recognition model, and/or to determine which voice recognition model to be changed from the current voice recognition model to correspond the voice recognition device.

More specifically, the use-related information may include at least one of a recognition performance of the voice recognition model corresponding to the voice recognition device, feedback from the user of the voice recognition device, meta information about the user of the voice recognition device, and/or an update request from the user of the voice recognition device.

The recognition performance of the voice recognition model corresponding to the voice recognition device may refer to a voice recognition rate of the voice recognition model used to recognize the voice data of the user received in the voice recognition device.

More specifically, when the first voice recognition device receives voice data from a first user and transmits the received voice data to the server 500, the voice recognition unit 521 (of the server 500) may output a voice recognition result using the first voice recognition model. In this example, the voice recognition unit 521 (of the server 500) may output a voice recognition rate indicating an accuracy of the voice recognition when the voice recognition is performed for the first user using the first voice recognition model.

The feedback from the user of the voice recognition device may be an element representing a satisfaction level of the user for the voice recognition model. For example, an element indicating that the satisfaction level of the user is low may include: when the voice recognition does not work properly so that the user uses negative expressions such as jargon/slang, etc.; when the voice recognition does not work properly so that the user continues to utter the same terms; when a reply to the voice from the user is output, but the user re-inquires the reply; and the like.

Therefore, the satisfaction level extracting unit 522 may extract the user feedback and the number of feedbacks such as jargon/slang, the number of voice recognition attempts (recurrence of the same terms), the re-inquiry, etc. from the voice data that the user uttered. The satisfaction level extracting unit 522 may input the number of feedbacks to a feedback static analysis model to obtain the satisfaction level of the user for the currently used voice recognition model.

The meta information regarding (or about) the user of the voice recognition device may mean personal information such as the user's gender, age, region, country, and/or the like. More specifically, the user may input the meta information thereof into the voice recognition device. In this example, the voice recognition device may transmit the meta information to the server 500.

The update request of the user of the voice recognition device may be a request to change the voice recognition model. More specifically, the user may request to change the voice recognition model. In this example, the voice recognition device may transmit the request to the server 500 to change the voice recognition model.

A process for updating the voice recognition model corresponding to the first voice recognition device may be described. The artificial intelligence unit 520 may obtain use-related information of the first voice recognition device 100 from among the plurality of voice recognition devices 100, 200, 300, and 400. More specifically, when the voice recognition service is provided to the first voice recognition device using the first voice recognition model, the artificial intelligence unit 520 may obtain the voice recognition performance of the first voice recognition model.

The artificial intelligence unit 520 may also analyze the voice data received from the first voice recognition device 100 to extract the feedback from the user, and may obtain the satisfaction level of the user based on the number of feedbacks from the user counted for a predetermined time. The artificial intelligence unit 520 may obtain the meta information of the user from the first voice recognition device 100. The artificial intelligence unit 520 may receive the update request for the voice recognition model from the first voice recognition device 100.

The use-related information thus obtained may be represented as shown in Table 1 below.

TABLE 1

| Device | Recognition Rate | Satisfaction level (number per period) | | | Meta Information | Update Request |
| --- | --- | --- | --- | --- | --- | --- |
| | | Negative expression (jargon/slang) | Number of attempts to reutter due to non-response from artificial intelligence | Re-inquiry about reply from artificial intelligence | | |
| First voice recognition device | 34.13 | 13 | 34 | 70% | Female/forties/ Gyeonggi | ○ |

Further, the artificial intelligence unit 520 may change the voice recognition model corresponding to the first voice recognition device from the first voice recognition model to the second voice recognition model based on the use-related information of the first voice recognition device.

More specifically, the artificial intelligence unit 520 may determine whether to change the voice recognition model based on the use-related information.

More specifically, the artificial intelligence unit 520 may determine whether to change the voice recognition model based on at least one of the voice recognition rate, the satisfaction level, or the update request.

For example, when the voice recognition rate is lower than a predetermined value or when the satisfaction level is lower than a predetermined value, the artificial intelligence unit 520 may determine to change the voice recognition model corresponding to the first voice recognition device from the first voice recognition model to another voice recognition model.

In another example, when the request to change the voice recognition model is received from the user, the artificial intelligence unit 520 may determine to change the voice recognition model corresponding to the first voice recognition device from the first voice recognition model to another voice recognition model. Further, upon determining to change the voice recognition model, the artificial intelligence unit 520 may determine a voice recognition model to be changed from the first voice recognition device based on the use-related information of the first voice recognition device.

More specifically, the plurality of voice recognition models may correspond to the plurality of categories, respectively. The plurality of categories may be classified by the meta information. In this example, the artificial intelligence unit 520 may determine a voice recognition model in a category corresponding to the meta information of the user from among the plurality of voice recognition models as a voice recognition model to be changed from the first voice recognition device based on the meta information regarding the user of the first voice recognition device.

For example, the meta information regarding the user may include Korea/Seoul/female. In addition, a second voice recognition model corresponding to a second category of Korea/Seoul/female/teenager and a third voice recognition model corresponding to a third category of Korea/Seoul/male/forties may be present. In this example, the artificial intelligence unit 520 may determine the second voice recognition model corresponding to the second category as a voice recognition model to be changed from the first voice recognition model.

The voice recognition model to be changed from the first voice recognition model is determined based on the meta information about the user of the first voice recognition device, but is not limited thereto.

More specifically, the artificial intelligence unit 520 may obtain utterance habit of the user based on the voice data of the user received from the first voice recognition device, and determine the voice recognition model to be changed from the first voice recognition model based on the utterance habit of the user.

For example, the artificial intelligence unit 520 may predict the user's region, gender, age, etc. using the utterance habit of the user. Additionally, the artificial intelligence unit 520 may determine the voice recognition model to be changed from the first voice recognition model based on the predicted information.

The artificial intelligence unit 520 may use a voice recognition engine classification model to determine whether to change the voice recognition model and determine the voice recognition model to be changed from the first voice recognition model.

More specifically, the voice recognition model update unit 523 (of the artificial intelligence unit 520) may perform a preprocessing process of assigning a weighted value to the use-related information.

The use-related information to which the weighted value is assigned may be shown in Table 2 below.

TABLE 2

| Device | Recognition Rate | Satisfaction Level (number per period) | | | Meta Information | Update request |
|---|---|---|---|---|---|---|
| | | Negative expression (jargon/slang) | Number of attempts to reutter due to non-response from artificial intelligence | Re-inquiry about reply from artificial intelligence | | |
| Weighted Value | 10 | 5 | 5 | 2 | 10 | 20 |
| First voice recognition device | 34.13 | 13 | 34 | 70% | Female/forties/Gyeonggi | ○ |

The voice recognition model update unit 523 may normalize the recognition performance and the satisfaction level of the voice recognition model to values between 0 and 1. The voice recognition model update unit 523 may classify the meta information into categories based on gender, age, region, and/or the like. Thereafter, the voice recognition model update unit 523 may perform variable number-processing (one-hot encoding) on the classified meta information to represent the same in a binary number.

The voice recognition model update unit 523 may assign 1 when there is an update request, and may assign 0 when there is no update request.

The pre-processed use-related information may be shown in Table 3 below.

TABLE 3

| Device | Recognition Rate | Satisfaction Level (number per period) | | | Meta Information | Update Request |
|---|---|---|---|---|---|---|
| | | Negative expression (jargon/slang) | Number of attempts to reutter due to non-response from artificial intelligence | Re-inquiry about reply from artificial intelligence | | |
| Weighted Value | 10 | 5 | 5 | 2 | 10 | 20 |
| First voice recognition Device | 0.34 | 0.13 | 0.34 | 0.7 | Category 7 (000000111) | 1 |

The voice recognition model update unit 523 may input the preprocessed use-related information to which the weight value is assigned, into the voice recognition engine classification model.

The voice recognition engine classification model may be a model in which: an artificial neural network uses machine learning to prerequisite-learn the use-related information and categories of the voice recognition model; and when the use-related information is input, the learned artificial neural network is used to determine whether to change the voice recognition model and determine the voice recognition model to be changed from the first voice recognition model.

The voice recognition engine classification model may be a model that classifies which voice recognition model will help improve performance of the corresponding voice recognition device.

The artificial intelligence unit 520 may input the preprocessed use-related information to which the weighted value is input into the voice recognition engine classification model to determine whether to change the voice recognition model and determine the voice recognition model to be changed from the first voice recognition model.

The process for determining whether to change the voice recognition model and determining the voice recognition model to be changed from the first voice recognition model may be performed individually for each voice recognition device.

More specifically, use-related information of the plurality of voice recognition devices is shown in Table 4. Additionally, use-related information that is assigned with the weighted value and is preprocessed is shown in Table 5.

In this example, the artificial intelligence unit 520 may change a voice recognition model and determine a voice recognition model to be changed from each of the plurality of voice recognition devices for each of the plurality of voice recognition devices.

This may be explained with reference to FIG. 7.

Figure 7:
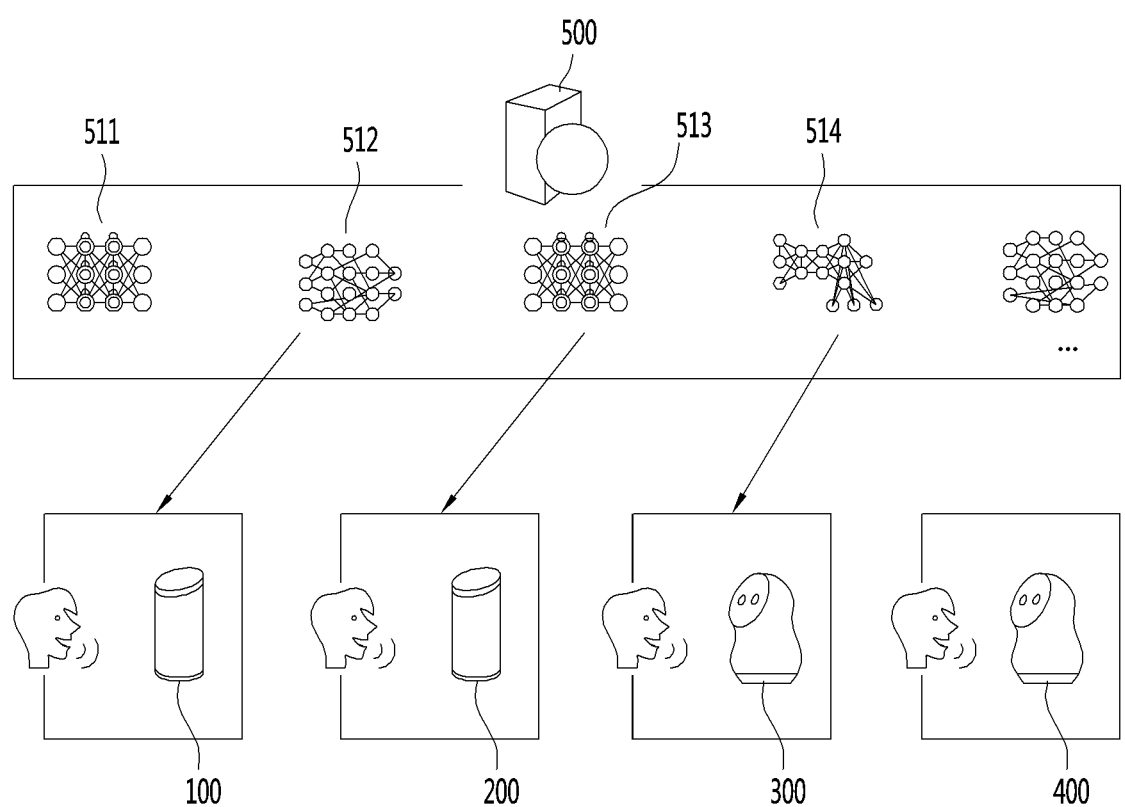
FIG. 7 is a diagram for illustrating a process for changing a voice recognition model corresponding to a plurality of voice recognition devices according to an embodiment of the present disclosure.

FIG. 7 is a diagram for illustrating a process for changing a voice recognition model corresponding to a plurality of voice recognition devices according to an embodiment of the present disclosure. Other embodiments and configurations may also be provided.

It may be described with reference to Table 4 and Table 5 together.

It is assumed that the first voice recognition device 100 and the second voice recognition device 200 are currently using the first voice recognition model 511, the third voice recognition device 300 is currently using the third voice recognition model 513, and the fourth voice recognition device 400 is currently using the fourth voice recognition model 514.

TABLE 4

| | Satisfaction level (number per period) | | | | | |
|---|---|---|---|---|---|---|
| Device | Recognition Rate | Negative expression (jargon/slang) | Number of attempts to reutter due to non-response from artificial intelligence | Re-inquiry about reply from artificial intelligence | Meta Information | Update Request |
| First voice recognition device | 34.13 | 13 | 34 | 70% | Female/forties/Gyeonggi | ○ |
| Second voice recognition device | 75.12 | 3 | 41 | 9% | Male/twenties/Gyeongsang | ○ |
| Third voice recognition device | 45.23 | 4 | 14 | 34% | Male/teenager/Seoul | ○ |
| Fourth voice recognition device | 64.53 | 0 | 7 | 9% | Female/seventies/Jeolla | X |

TABLE 5

| | Satisfaction Level (number per period) | | | | | |
|---|---|---|---|---|---|---|
| Device | Recognition Rate | Negative expression (jargon/slang) | Number of attempts to reutter due to non-response from artificial intelligence | Re-inquiry about reply from artificial intelligence | Meta information | Update Request |
| Weighted Value | 10 | 5 | 5 | 2 | 10 | 20 |
| First voice recognition device | 0.34 | 0.13 | 0.34 | 0.7 | Category 7 (000000111) | 1 |
| Second voice recognition device | 0.75 | 0.03 | 0.41 | 0.09 | Category 56 (000111000) | 1 |
| Third voice recognition device | 0.45 | 0.04 | 0.14 | 0.34 | Category 1 (000000001) | 1 |
| Fourth voice recognition device | 0.64 | 0 | 0.07 | 0.6 | Category 70 (1000110) | 0 |

No voice recognition model update request was received from the fourth voice recognition device 400.

When the voice recognition model update request is not received, the user of the fourth voice recognition device 400 may be in a state satisfying a voice recognition performance of the fourth voice recognition model 514. Therefore, when the voice recognition model update request is not received from the fourth voice recognition device 400, the server 500 may determine not to change the voice recognition model corresponding to the fourth voice recognition device 400.

The server 500 may transmit an update proposal about the voice recognition model to the fourth voice recognition device 400 based on the use-related information of the fourth voice recognition device 400.

More specifically, when the recognition rate of the fourth voice recognition model is lower than a predetermined value, or the satisfaction level of the user of the fourth voice recognition device 400 is lower than a predetermined value, the server 500 may transmit the update proposal about the voice recognition model of the fourth voice recognition device 400 to the fourth voice recognition device 400.

Additionally, when an update request about the voice recognition model is received from the fourth voice recognition device 400, the server 500 may change the voice recognition model corresponding to the fourth voice recognition device 400 from the fourth voice recognition model 514 to another voice recognition model.

The server 500 may receive a voice recognition model update request from the first voice recognition device 100 while providing the voice recognition service to the first voice recognition device 100 using the first voice recognition model 511.

In this example, the server 500 may change the voice recognition model corresponding to the first voice recognition device 100 from the first voice recognition model 511 to the second voice recognition model 512 based on the use-related information of the first voice recognition device 100. More specifically, the server 500 may select the second voice recognition model 512 that may optimize performance of the voice recognition based on the satisfaction level for the first voice recognition model 511 of the user of the first voice recognition device 100, the meta information about the user of the first voice recognition device 100, and the recognition performance of the first voice recognition model 511 on the utterance of the user of the first voice recognition device 100. The server 500 may then provide the voice recognition service to the first voice recognition device 100 using the second voice recognition model 512.

The server 500 may receive a voice recognition model update request from the second voice recognition device 200 while providing the voice recognition service to the second voice recognition device 200 using the first voice recognition model 511.

In this example, the server 500 may change the voice recognition model corresponding to the second voice recognition device 200 from the first voice recognition model 511 to the third voice recognition model 513 based on the use-related information of the second voice recognition device 200. More specifically, the server 500 may select the third voice recognition model 513 that may optimize the performance of the voice recognition based on the satisfaction level for the first voice recognition model 511 of the user of the second voice recognition device 200, the meta information about the user of the second voice recognition device 200, and the recognition performance of the first voice recognition model 511 on the utterance of the user of the second voice recognition device 200. The server 500 may provide the voice recognition service to the second voice recognition device 200 using the third voice recognition model 513.

The server 500 may receive a voice recognition model update request from the third voice recognition device 300 while providing the voice recognition service to the third voice recognition device 300 using the third voice recognition model 513.

In this example, the server 500 may change the voice recognition model corresponding to the third voice recognition device 300 from the third voice recognition model 513 to the fourth voice recognition model 514 based on the use-related information of the third voice recognition device 300. More specifically, the server 500 may select the fourth voice recognition model 514 that may optimize the performance of the voice recognition based on the satisfaction level for the third voice recognition model 513 of the user of the third voice recognition device 300, the meta information about the user of the third voice recognition device 300, and the recognition performance of the third voice recognition model 513 on the utterance of the user of the third voice recognition device 300. The server 500 may then provide the voice recognition service to the third voice recognition device 300 using the fourth voice recognition model 514.

When the update is completed, the server 500 may output an update notification to the voice recognition device;

For example, the server 500 may control the voice recognition device to output a message of "The performance of your voice recognition device has been improved.".

In another example, the server 500 may obtain a voice recognition rate of the changed voice recognition model from the original voice recognition model.

The server 500 may then control the voice recognition device to output a message of "The voice recognition engine has been tuned to match your voice to improve the recognition rate by 4%.".

In another example, as the voice recognition model is changed based on the user's meta information, a voice recognition function for the user's age, gender, region, and/or the like may be strengthened. Therefore, the server 500 may control the voice recognition device to output a message of "The intent grasp and response performances have been improved oriented mainly based on functions and words that you frequently use.", "The intelligence is more strengthened, on beauty/cooking/health, etc. that women in their forties might be interested in.", etc.

In the above-described embodiment, the voice recognition model may be changed when there is the update request from the user, but is not limited thereto.

More specifically, the server 500 may automatically change the voice recognition model based on at least one of the feedback from the user of the voice recognition device, the meta information about the user of the voice recognition device, and/or the recognition performance of the voice recognition model corresponding to the voice recognition device.

In this example, the server 500 may transmit the voice recognition model update notification to the voice recognition device.

According to the present disclosure, the voice recognition models in the various categories are trained individually and taking into account individual characteristics of the large number of users. Additionally, the voice recognition model in the category adapted to the characteristics of the user may be updated. Thus, performance deterioration which may occur via all-at-once update may be suppressed. Additionally, the voice recognition service may be updated using the voice recognition model optimized for the user.

According to the present disclosure, whether to update the voice recognition model may be determined by taking into account the user's update request or the user satisfaction level. Thus, the performance deterioration of the voice recognition service, which may occur via the forced all-at-once update, may be suppressed.

According to the present disclosure, the feedback from the user may be analyzed. Thus, the satisfaction level of the user may be calculated automatically, and the update may be performed even when there is no update request from the user by analyzing the feedback from the user.

In the above description, the present disclosure may be described as being used for the voice recognition model, but is not limited thereto.

More specifically, the server may provide, to a plurality of cleaning robots, a cleaning service that recognizes a space or an obstacle and determines a cleaning mode, a cleaning time, etc. based on a user's preference.

In this example, a plurality of cleaning models may be classified based on space information (obstacle, lighting, floor material, etc.), user preference (user preferred cleaning time, user preferred cleaning mode, user preferred cleaning pattern, etc.), a family structure, and the like.

The server 500 may obtain use-related information of the cleaning robot. For example, when the user continuously changes the cleaning mode/time manually without using an automatic cleaning mode/time recommended by the cleaning robot, the server 500 may determine that a satisfaction level of the user is low.

In this example, the server 500 may change the cleaning mode based on the space information (obstacle, lighting, floor material, etc.), the user preference (user preferred cleaning time, user preferred cleaning mode, user preferred cleaning pattern, etc.), the family structure, and the like.

When the cleaning model change is complete, the server 500 may control the cleaning robot to output a message of "A performance of an automatic cleaning mode recommendation engine in your cleaning robot has been more improved.", "The performance of the recommendation engine has been tuned to be improved based on cleaning mode/time/usage pattern that you prefer. Additionally, the performance is strengthened to analyze the lighting and obstacle in the house to recognize an object in your space more smartly and to move", and/or the like.

The controller may be used interchangeably with terms such as a central processing device, a microprocessor, a processor, and/or the like.

The present disclosure described above may be implemented as computer readable code on a medium on which a program is recorded. The computer readable medium includes any type of recording device that stores data that may be read by a computer system. Examples of the computer readable medium include a hard disk drive (HDD), a solid state disk (SSD), a silicon disk drive (SDD), a ROM, a RAM, a CD-ROM, a magnetic tape, a floppy disk, an optical data memory device, and the like. Further, the computer may include the controller 180 of the terminal. Accordingly, the above description should not be construed in a limiting sense in all respects and should be considered illustrative. The scope of the present disclosure should be determined by rational interpretation of the appended claims, and all changes within the equivalence range of the present disclosure are included in the scope of the present disclosure.

A purpose of the present disclosure is to provide a voice recognition model customized to a user of each of electric devices in order to solve at least the above-mentioned problems.

In a first aspect of the present disclosure, there is provided a server for providing a voice recognition service, the server including: a memory configured for storing a plurality of voice recognition models; a communicator configured for communicating a plurality of voice recognition devices; and an artificial intelligence unit configured for: providing a voice recognition service to the plurality of voice recognition devices; acquiring use-related information about a first voice recognition device among the plurality of voice recognition devices; and changing a voice recognition model corresponding to the first voice recognition device from a first voice recognition model to a second voice recognition model based on the use-related information.

In one implementation of the first aspect, the artificial intelligence unit may be configured for: acquiring use-related information about a second voice recognition device among the plurality of voice recognition devices; and changing a voice recognition model corresponding to the second voice recognition device from the first voice recognition model to a third voice recognition model based on the use-related information about the second voice recognition device.

In one implementation of the first aspect, the use-related information may include at least one of feedback from a user of the first voice recognition device, meta information about the user of the first voice recognition device, recognition performance of a voice recognition model corresponding to the first voice recognition device, or update request from the user of the first voice recognition device.

In one implementation of the first aspect, the meta information may include at least one of a gender, age, region, or country of the user.

In one implementation of the first aspect, the feedback from the user may include at least one of voice recognition attempt, re-inquiry, or use of jargon or use of slang of the user.

In one implementation of the first aspect, the recognition performance of the voice recognition model corresponding to the first voice recognition device may include a voice recognition rate when a voice of the user of the first voice recognition device is recognized using the first voice recognition model.

In one implementation of the first aspect, the artificial intelligence unit may determine whether to change the voice recognition model corresponding to the first voice recognition device based on the use-related information about the first voice recognition device, and upon determination to change the voice recognition model corresponding to the first voice recognition device, the artificial intelligence unit may determine the second voice recognition model based on at least one of utterance habit or the meta information about the user of the first voice recognition device.

In one implementation of the first aspect, the artificial intelligence unit may be configured for: assigning a weighted value to the use-related information; and inputting the use-related information assigned with the weighted value into a voice recognition engine classification model to determine whether to change the voice recognition model and to determine the second voice recognition model.

In a second aspect of the present disclosure, there is provided a method for operating a server for providing a voice recognition service, the method including: providing a voice recognition service to a plurality of voice recognition devices; acquiring use-related information about a first voice recognition device among the plurality of voice recognition devices; and changing a voice recognition model corresponding to the first voice recognition device from a first voice recognition model to a second voice recognition model based on the use-related information.

In one implementation of the second aspect, the method may further include: acquiring use-related information about a second voice recognition device among the plurality of voice recognition devices; and changing a voice recognition model corresponding to the second voice recognition device from the first voice recognition model to a third voice recognition model based on the use-related information about the second voice recognition device.

In one implementation of the second aspect, the use-related information may include at least one of feedback from a user of the first voice recognition device, meta information about the user of the first voice recognition device, recognition performance of a voice recognition model corresponding to the first voice recognition device, or update request from the first voice recognition device.

In one implementation of the second aspect, the meta information may include at least one of a gender, age, region, or country of the user.

In one implementation of the second aspect, the feedback from the user may include at least one of voice recognition attempt, re-inquiry, or use of jargon or use of slang of the user.

In one implementation of the second aspect, the recognition performance of the voice recognition model corresponding to the first voice recognition device may include a voice recognition rate when a voice of the user of the first voice recognition device is recognized using the first voice recognition model.

In one implementation of the second aspect, the changing of the voice recognition model corresponding to the first voice recognition device from the first voice recognition model to the second voice recognition model may include: determining whether to change the voice recognition model corresponding to the first voice recognition device based on the use-related information about the first voice recognition device; and determining the second voice recognition model based on at least one of utterance habit or the meta information of the user of the first voice recognition device, upon determination to change the voice recognition model corresponding to the first voice recognition device.

In one implementation of the second aspect, the changing of the voice recognition model corresponding to the first voice recognition device from the first voice recognition model to the second voice recognition model may include: assigning a weighted value to the use-related information; and inputting the use-related information assigned with the weighted value into a voice recognition engine classification model to determine whether to change the voice recognition model and to determine the second voice recognition model.

According to the present disclosure, voice recognition models in various categories may be trained individually by taking into account individual characteristics of a large number of users. Additionally, a voice recognition model in a category adapted to characteristics of the user may be updated. Thus, performance deterioration, which may occur via all-at-once update, may be suppressed. Additionally, the voice recognition service may be updated using the voice recognition model optimized for the user.

According to the present disclosure, whether to update the voice recognition model may be determined by taking into account the user's update request or the user satisfaction level. Thus, performance deterioration of the voice recognition service, which may occur via the forced all-at-once update, may be suppressed.

According to the present disclosure, feedback from the user may be analyzed. Thus, the satisfaction level of the user may be calculated automatically, and the update may be performed even when there is no update request from the user by analyzing the feedback from the user.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A server for providing a voice recognition service, the server comprising:
    a memory configured to store a plurality of voice recognition models;
    a communication device configured to communicate with a plurality of voice recognition devices; and
    an artificial intelligence device configured to:
        provide a voice recognition service to the plurality of voice recognition devices;
        obtain, via the communication device, use-related information relating to a first one of the voice recognition devices, wherein the use-related information relating to the first one of the voice recognition devices includes a feedback from a user of the first one of the voice recognition devices; and
        change a voice recognition model corresponding to the first one of the voice recognition devices from a first voice recognition model to a second voice recognition model based on the use-related information relating to the first one of the voice recognition devices,
    wherein the artificial intelligence device is further configured to:
    determine a number of the feedback based on a total number of an utterance of a same term and based on a total number of a re-inquiry utterance for a predetermined time,
    determine a satisfaction level of the user of the first one of the voice recognition devices based on the determined number of the feedback for the predetermined time, and
    determine to change the voice recognition model corresponding to the first one of the voice recognition devices from the first voice recognition model to the second voice recognition model based on the determined satisfaction level.

2. The server of claim 1, wherein the artificial intelligence device is configured to:
    obtain, via the communication device, use-related information relating to a second one of the voice recognition devices; and
    change a voice recognition model corresponding to the second one of the voice recognition device from the first voice recognition model to a third voice recognition model based on the use-related information relating to the second one of the voice recognition devices.

3. The server of claim 1, wherein the use-related information relating to the first one of the voice recognition devices includes at least one of meta information related to the user of the first one of the voice recognition devices, recognition performance of a voice recognition model corresponding to the first one of the voice recognition devices, and an update request from the user of the first one of the voice recognition devices.

4. The server of claim 3, wherein the meta information relating to the user includes at least one of a gender, age, region, and country of the user.

5. The server of claim 3, wherein the recognition performance of the voice recognition model corresponding to the first one of the voice recognition devices includes a voice recognition rate when a voice of the user of the first one of the voice recognition devices is recognized using the first voice recognition model.

6. The server of claim 3, wherein the artificial intelligence device determines whether to change the voice recognition model corresponding to the first one of the voice recognition devices based on the use-related information relating to the first one of the voice recognition devices, and
    wherein in response to the artificial intelligence device, determining to change the voice recognition model corresponding to the first one of the voice recognition devices, the artificial intelligence device is to determine the second voice recognition model based on at least one of utterance habit or the meta information relating to the user of the first one of the voice recognition devices.

7. The server of claim 3, wherein the artificial intelligence device is configured to:
    assign a weighted value to the use-related information; and
    provide the use-related information assigned with the weighted value into a voice recognition engine classification model in order to determine whether to change the voice recognition model and to determine the second voice recognition model.

8. The server of claim 1, wherein the artificial intelligence device is configured to control the communication device to transmit an update notification to the first one of the voice recognition devices when the voice recognition model is changed.

9. The server of claim 1, wherein the artificial intelligence device is a controller that controls the communication device and the memory.

10. A method for operating a server for providing a voice recognition service, the method comprising:
    providing a voice recognition service to a plurality of voice recognition devices;
    obtaining, at the server, use-related information relating to a first one of the voice recognition devices, wherein the use-related information relating to the first one of the voice recognition devices includes a feedback from a user of the first one of the voice recognition devices; and
    changing, at the server, a voice recognition model corresponding to the first one of the voice recognition devices from a first voice recognition model to a second voice recognition model based on the use-related information relating to the first one of the voice recognition devices, wherein the method further comprises:
- determine a number of the feedback based on a total number of an utterance of a same term and based on a total number of a re-inquiry utterance for a predetermined time,
- determine a satisfaction level of the user of the first one of the voice recognition devices based on the determined number of the feedback for the predetermined time, and
- determine to change the voice recognition model corresponding to the first one of the voice recognition devices from the first voice recognition model to the second voice recognition model based on the determined satisfaction level.

11. The method of claim 10, further comprising:
- obtaining use-related information relating to a second one of the voice recognition devices; and
- changing, at the server, a voice recognition model corresponding to the second one of the voice recognition devices from the first voice recognition model to a third voice recognition model based on the use-related information relating to the second one of the voice recognition devices.

12. The method of claim 10, wherein the use-related information relating to the first one of the voice recognition devices includes at least one of meta information relating to the user of the first one of the voice recognition devices, recognition performance of a voice recognition model corresponding to the first one of the voice recognition devices, and an update request from the first one of the voice recognition devices.

13. The method of claim 12, wherein the meta information relating to the user includes at least one of a gender, age, region, and country of the user.

14. The method of claim 12, wherein the recognition performance of the voice recognition model corresponding to the first one of the voice recognition devices includes a voice recognition rate when a voice of the user of the first one of the voice recognition devices is recognized using the first voice recognition model.

15. The method of claim 12, wherein the changing of the voice recognition model corresponding to the first one of the voice recognition devices from the first voice recognition model to the second voice recognition model includes:
- determining whether to change the voice recognition model corresponding to the first one of the voice recognition devices based on the use-related information relating to the first one of the voice recognition devices; and
- determining the second voice recognition model based on at least one of utterance habit or the meta information relating to the user of the first one of the voice recognition devices, upon determining to change the voice recognition model corresponding to the first one of the voice recognition devices.

16. The method of claim 12, wherein the changing of the voice recognition model corresponding to the first one of the voice recognition devices from the first voice recognition model to the second voice recognition model includes:
- assigning a weighted value to the use-related information; and
- providing the use-related information assigned with the weighted value into a voice recognition engine classification model in order to determine whether to change the voice recognition model and to determine the second voice recognition model.

17. The method of claim 10, further comprising transmitting an update notification to the first one of the voice recognition device when the voice recognition model is changed.

18. The method of claim 10, wherein the server includes a memory to store the plurality of voice recognition models, and a controller that is configured to change the voice recognition model corresponding to the first one of the voice recognition devices.

* * * * *